United States Patent [19]

Trihey

[11] Patent Number: 4,649,900
[45] Date of Patent: Mar. 17, 1987

[54] SOLAR TRACKING SYSTEM

[76] Inventor: John M. Trihey, 36 Oban Road, Ringwood, Victoria, Australia

[21] Appl. No.: 698,893

[22] Filed: Feb. 6, 1985

[30] Foreign Application Priority Data

Feb. 8, 1984 [AU] Australia .................. PG3512/84
Aug. 24, 1984 [AU] Australia .................. PG6763/84

[51] Int. Cl.⁴ .................................. F24J 2/38
[52] U.S. Cl. ........................ 126/425; 126/438; 126/424; 250/203 R
[58] Field of Search ............... 126/424, 425, 438, 439, 126/451; 250/203 R

[56] References Cited

U.S. PATENT DOCUMENTS 4,068,653  1/1978  Bourdon et al. ............... 126/425
4,147,154  4/1979  Lewandowski ............... 126/425
4,192,289  3/1980  Clark ............................ 126/425

Primary Examiner—Larry Jones
Attorney, Agent, or Firm—Cushman, Darby & Cushman

[57] ABSTRACT

A solar energy conversion apparatus which includes a reflective parabolic trough which tracks the sun the control means therefor being such that the trough rotates about a north-south axis alternately to east and west extreme positions until the driving motor is disabled by equal irradiation of a pair of phototransistors. The phototransistors are aligned relative to the axis of the trough such that they are equally irradiated when the sun's rays are concentrated on a heat transfer tube extending along the axis of the trough. The apparatus has a flexible disc drive member to mechanically couple the trough to the drive motor. The heat transfer conduit is of relatively small capacity and a two-phase flow therein is utilized so as to conserve energy.

18 Claims, 13 Drawing Figures

SOLAR TRACKING SYSTEM

This invention relates to solar energy systems.

This invention relates to a solar tracking system, more particularly, the invention is concerned with improvements in and relating to solar tracking systems for use with solar tracking troughs which are arranged to concentrate the sun's rays on a heat transfer target.

According to the first aspect of the invention there is provided a method of constraining an object to track the sun, the object being mounted for rotation about an axis and having a reversible motor for rotating the object and a control circuit for controlling operation of the motor, the control circuit having first and second limit switches which are operable to reverse the direction of rotation when the object has reached first and second extreme positions, said method comprising the steps of:

(a) orientating the object so that its axis lies in predetermined direction, (b) activating the control circuit so that the motor causes rotation of the object, (c) generating an interrupt signal to interrupt supply of power to the motor when the object is directed at the sun, and (d) after generation of the interrupt signal, re-applying power to the motor such that it rotates the object towards the westerly direction until generation of a subsequent interrupt signal on realignment of the object with the sun.

Preferably the interrupt signal is generated in response to equal irradiation by the sun of a pair of solar radiation sensitive elements.

According to a second aspect of the invention there is provided solar tracking apparatus comprising an object mounted for rotation about an axis which, in use, is oriented in a predetermined direction, a reversible motor coupled to cause rotation of the object about said axis and control means for controlling the motor such that it rotates the object between first and second extreme positions which, in use, are located towards the West and East respectively, said control means including solar energy sensitive elements mounted for movement with the object and operable to produce an interrupt signal when the object is aligned with the sun to arrest movement of the object, said interrupt signal inhibiting rotation of the motor whilst the object remains aligned with the sun and wherein the control circuit causes rotation of the object towards said first extreme position when the object is no longer aligned with the sun.

Preferably the predetermined direction is the North-South direction.

The solar energy sensitive elements are preferably connected to respective inputs of a differential amplifier and arranged to produce the interrupt signal when the phototransistors are equally irradiated by solar radiation.

The method of the invention preferably includes the further step of having a predetermined delay say of 10 minutes each time the first and second limit switches are activated. This prevents repetitive forward and reverse movement during those periods when there is insufficient solar intensity to generate the interrupt signal.

The invention will now be further described with reference to the accompanying drawings, in which.

Figure 1:
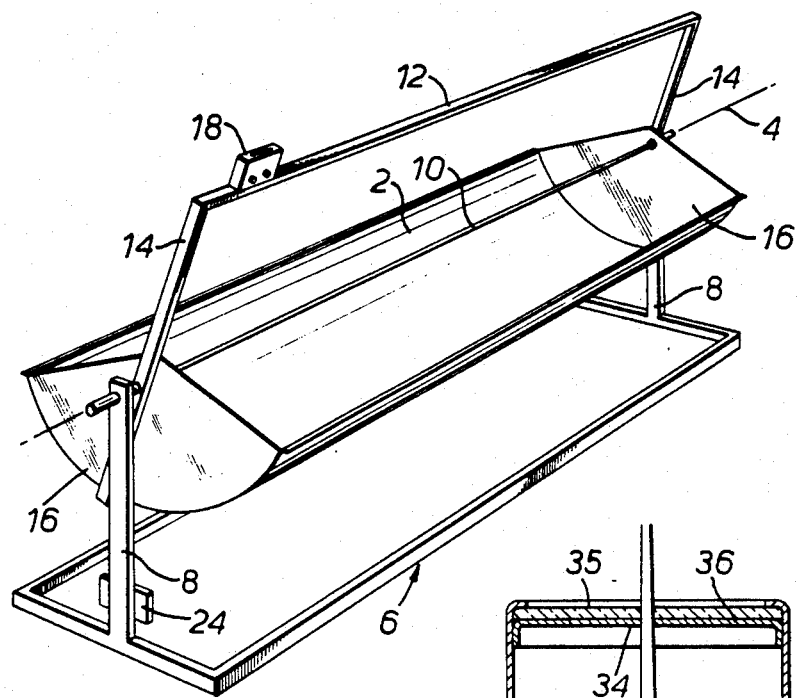
FIG. 1 is a schematic view of a solar collecting apparatus incorporating the tracking system of the invention.
Figure 9:
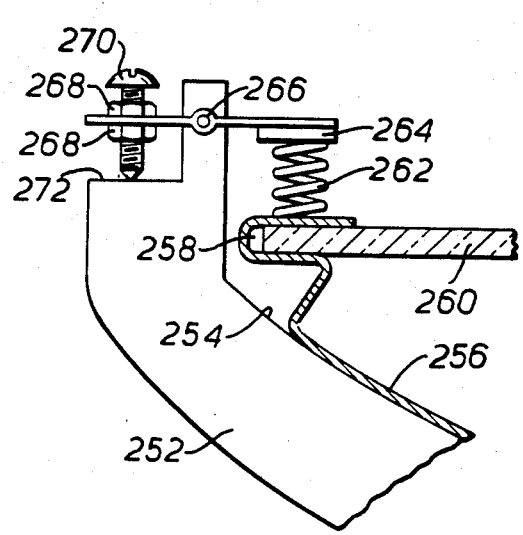
Figure 10:
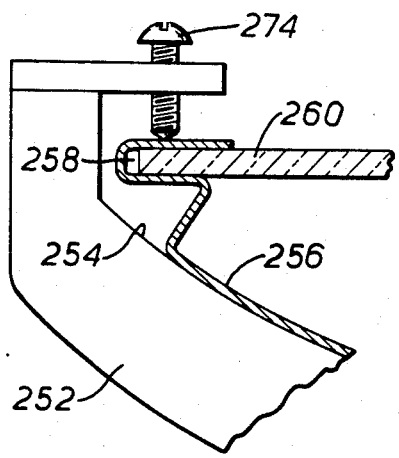
Figures 11, 12:
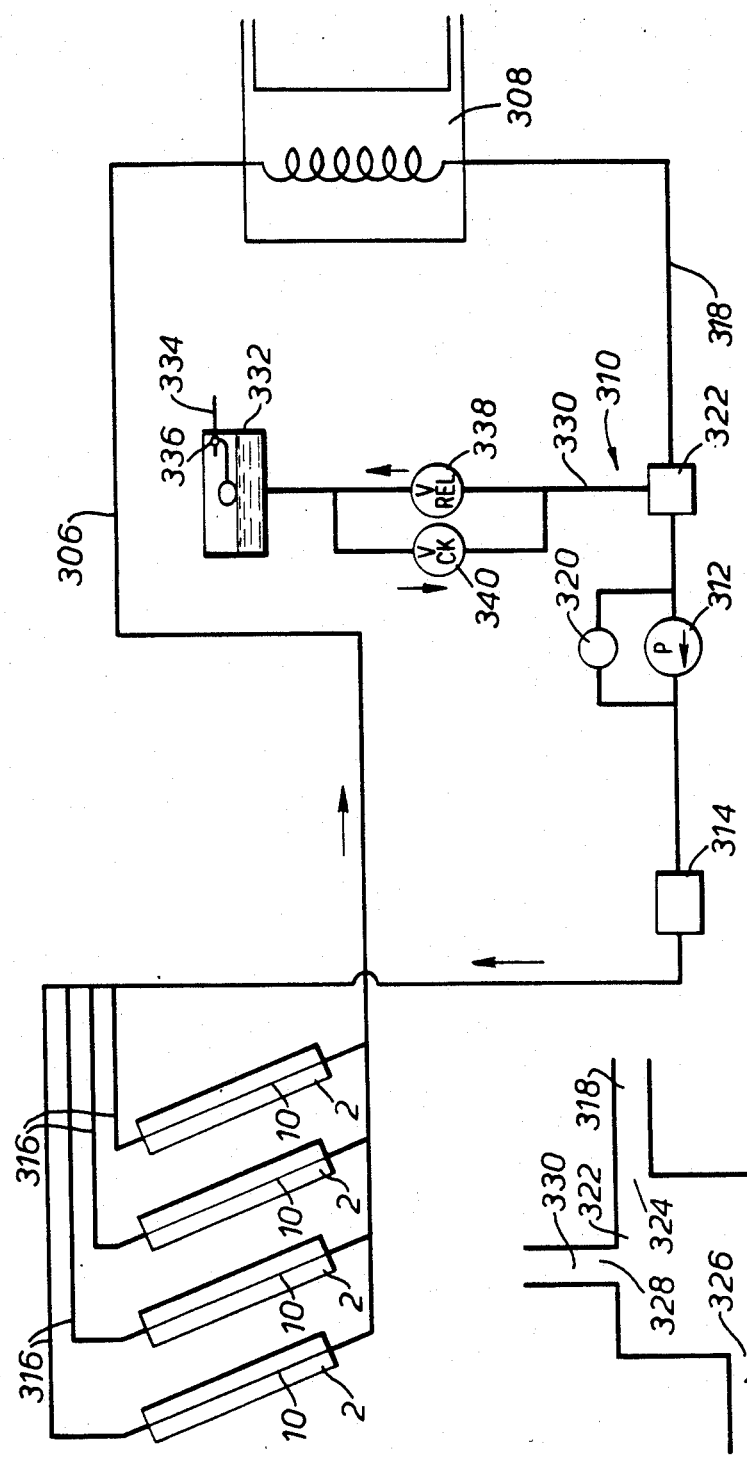

FIG. 9 diagrammatically illustrates part of an improved reflective trough structure;

FIG. 10 is a similar view of a modified form of structure;

FIG. 11 is a schematic view of a solar conversion system of the invention;

FIG. 12 is a more detailed view of one part of the system shown in FIG. 1; and

Figure 13:
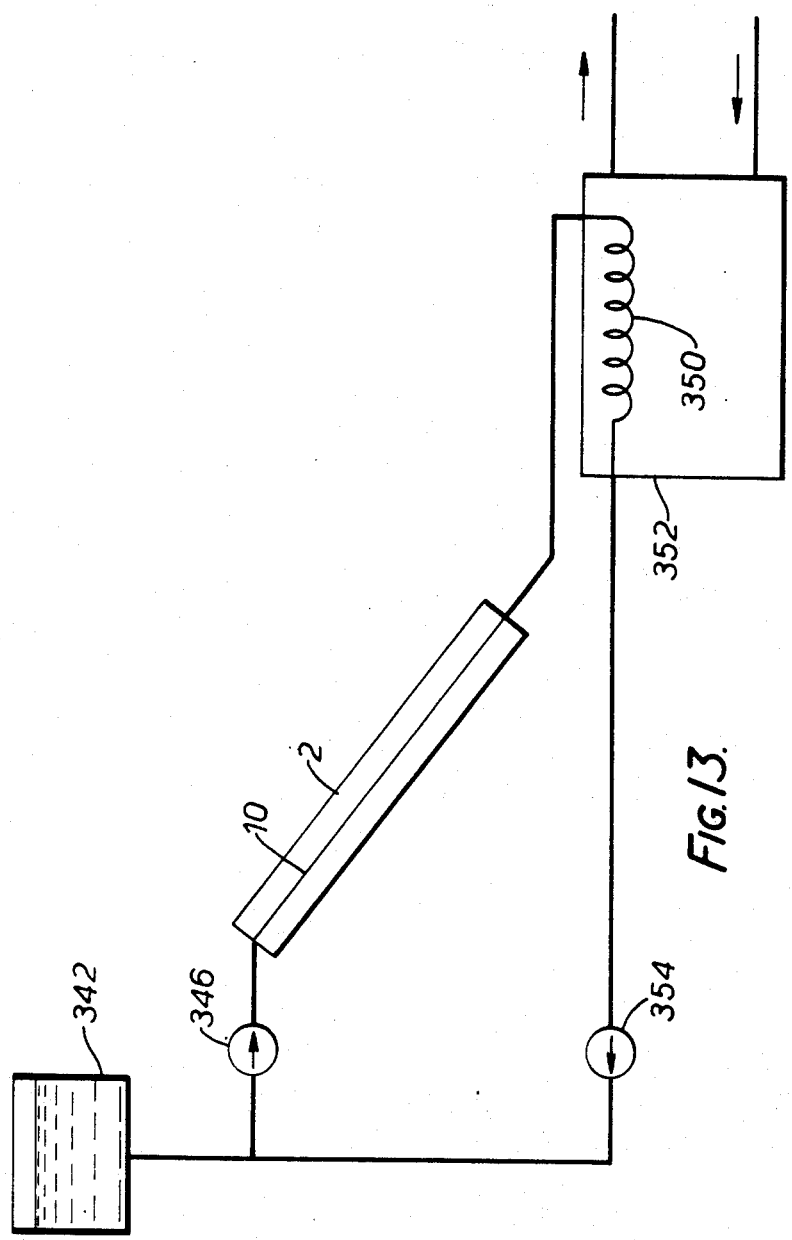

FIG. 13 is a schematic view of a heat transfer fluid circulation system of the invention.

Figure 5:
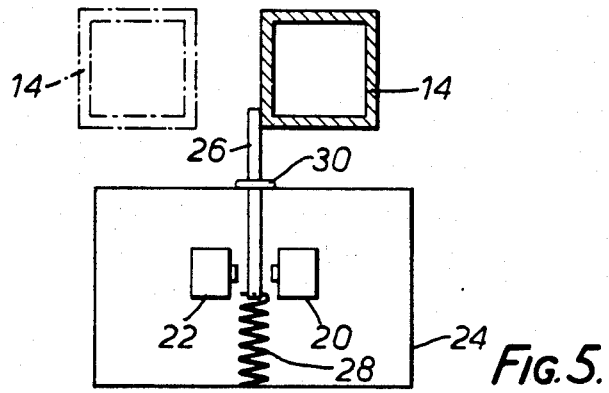
FIG. 5 is a schematic illustration showing the east and west limit switches.

The solar tracking apparatus shown in FIG. 1 comprises a parabolic trough 2 mounted for rotation about its axis 4 on a framework 6 having uprights 8. A heat transfer tube 10 is located along the axis of the trough and when the trough is correctly aligned at the sun, solar energy is concentrated onto the heat transfer tube 10. The trough 2 includes a counterbalance bar 12 carried by arms 14 connected to end plates 16 of the trough. The bar 12 carries a tracking head 18 which generates signals for causing alignment of the trough with the sun. East and west limit switches 20 and 22 are mounted in a housing 24 which is connected to one of the uprights 8. The axis 4 is oriented in the north-south direction. When the trough 2 is rotated to its extreme position towards the east the arm 14 engages a pivoted lever 26 which in turn operates the microswitch 20, as seen in FIG. 5. When the trough is rotated towards its western extremity, the arm 14 will engage the pivoted arm 26 from the opposite direction and cause operation of the other microswitch 22 as shown in broken lines in FIG. 5. As will be described hereinafter, the switches 20 and 22 cause reversal of the direction of rotation of the trough after elapse of a predetermined period. When the trough rotates through a position in which it is aligned with the sun that is to say when all of the sun's rays are focused on its focal line 4, the tracking head 18 will produce an interrupt signal to arrest movement of the trough and the trough will remain stationary with the sun's rays concentrated on the heat transfer tube 10. Subsequent movement of the sun's rays relative to the head 18 will cause the head 18 to generate further tracking signals to cause the trough to follow the sun and maintain the sun's rays concentrated on the transfer tube 10.

In the preferred form of apparatus, the east and west limit switches 20 and 22 are located within the housing 24 connected to the upright 8. The same housing can be used for other control circuitry of the system. The arm 26 extends through an opening in the housing and its inner end is connected to the opposite wall of the housing by means of a tension spring 28. Inward movement of the arm 26 is limited by a collar 30 mounted on the arm 26 and engagable with the housing 24.

Figure 2:
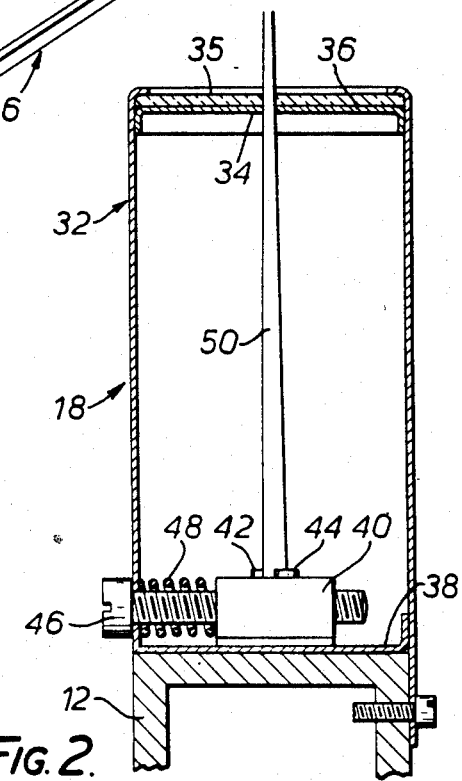
FIG. 2 is a cross sectional view of a tracking head of the invention.
Figure 3:
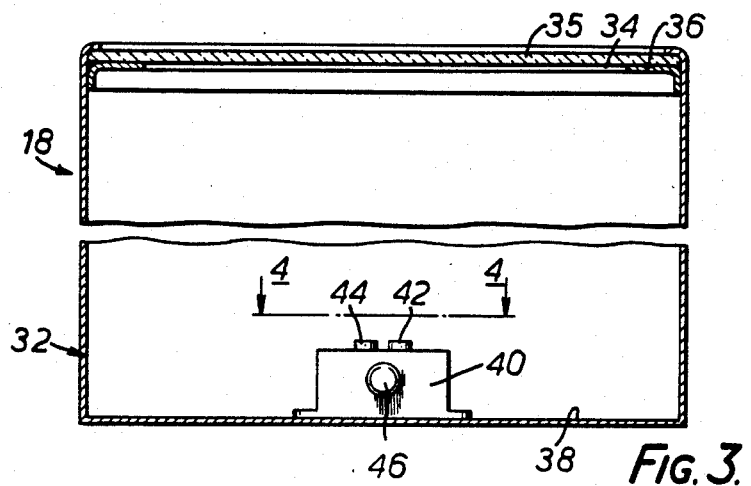
FIG. 3 is a side view of the head.
Figure 4:
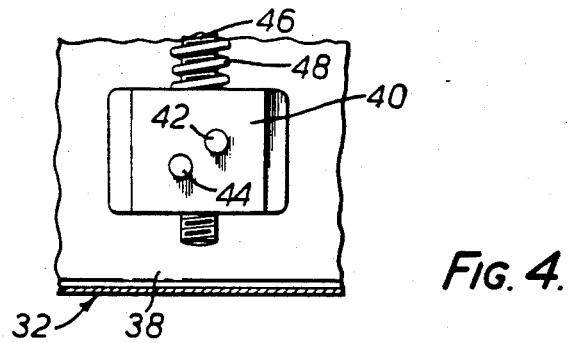
FIG. 4 is a fragmentary view taken along the line 4—4.

The preferred form of tracking head 18 is illustrated in FIGS. 2, 3 and 4. The head includes a housing 32 having an elongate narrow slot 34 in its top surface 36 which is surmounted by a glass pane 35, the housing thus being closed. Mounted generally centrally of the base 38 of the housing, is a platform 40 on the upper surface of which is mounted two phototransistors 42 and 44 or other solar energy sensitive cells. In use of the head 18, the slot 34 is arranged to be parallel to the axis 4 of the trough and thus the slot 34 extends in the north-south direction. The lateral position of the platform 40 relative to the housing 32 can be adjusted by means of an adjusting screw 46 which extends through a opening in the housing 32 and is received within a nut (not shown) connected to the platform 40. A compression spring 48 encircles the stem of the screw 46 and acts between the housing 32 and the platform 40 and prevents unwanted movement of the platform. When the head 18 is correctly aligned with the sun, the sun's rays 50 will impinge upon the phototransistors 42 and 44 to an equal extent, as diagrammatically illustrated in FIG. 2. The adjusting screw 46 can be adjusted so as to ensure that the concentrated solar radiation from the trough 2 is focused on the heat transfer tube 10 when equal irradiation of the phototransistors 42 and 44 occurs.

Figure 6:
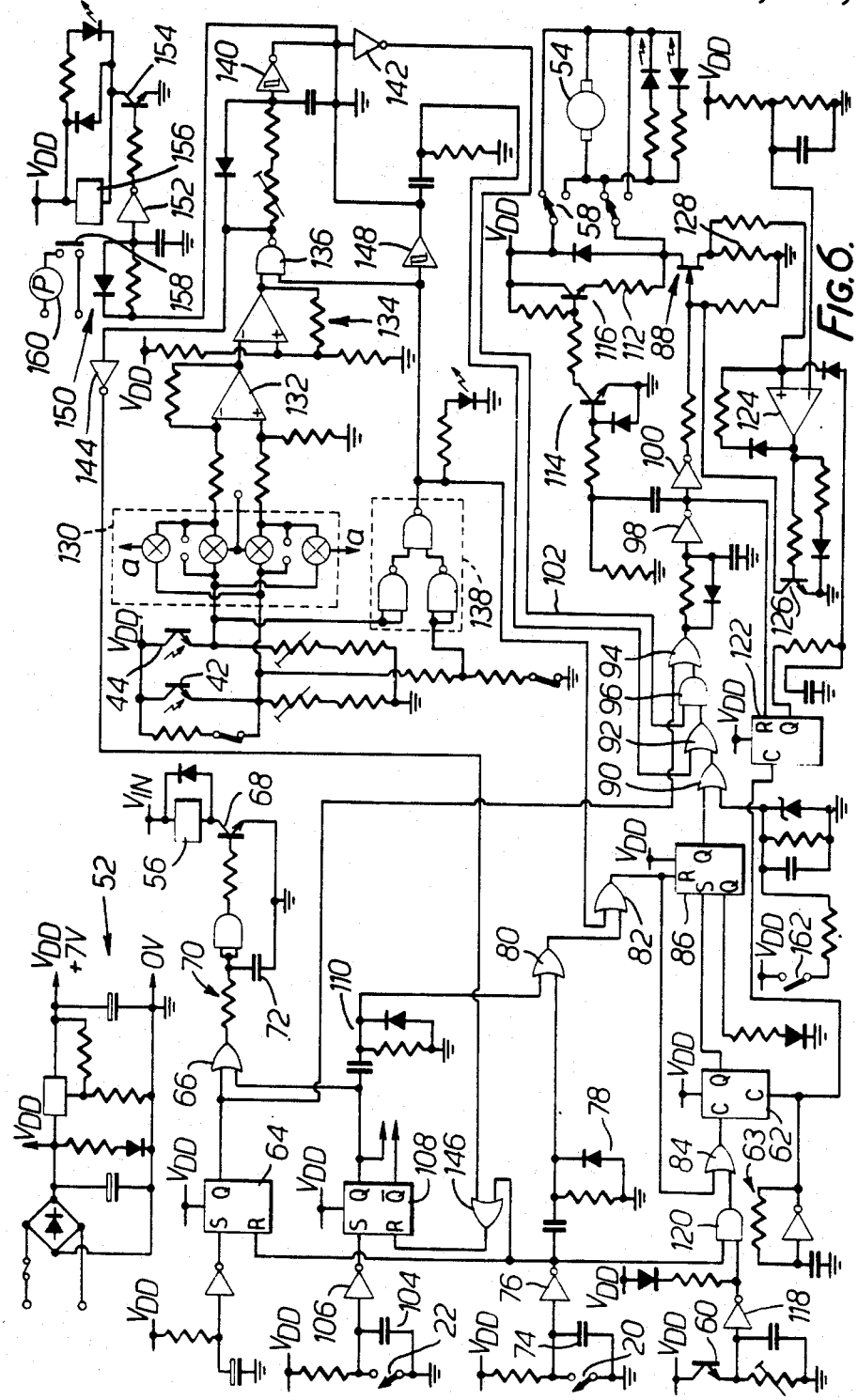
FIG. 6 shows a preferred circuit for use in the system of the invention.

The preferred form of control circuitry is illustrated in FIG. 6. The circuit includes a power supply 52 for producing DC levels required for the circuit and for a motor 54 which rotates the trough 2 about its axis 4.

The circuit includes a relay coil 56 having contacts 58 for reversing the motor 54 when the east or west limit switches 20 or 22 are engaged. When the relay coil 56 is not energised the contacts 58 are such that the motor 54 rotates the trough 2 towards the west. The circuit also includes a master cell for enabling operation of the circuitry during daylight hours only. In the illustrated circuit, the master cell comprises a phototransistor 60. The other inputs to the circuitry are the phototransistors 42 and 44.

The circuit further includes a timer 62 which is clocked by pulses from oscillator 63 whose pulse rate is say 3 to 4 Hz. The timer 62 operates to produce a predetermined delay, say 10 minutes, after the east or west limit switch 20 or 22 has been activated so as to prevent unwanted continuous reversing of the trough 2 when there is enough daylight to activate the cell 60 but insufficient intensity to cause the tracking phototransistors 42 and 44 to operate.

On applying power to the supply circuit 52, the Q output of a flip-flop 64 will be high and that will remain high until the east limit switch 20 is activated. The Q output of the flip-flop 64 is connected to a OR gate 66 the output of which is coupled to the base of a relay drive transistor 68 via a resistor 70 and capacitor 72. When the Q output of the flip-flop 64 is high the drive transistor 68 will be on and the coil 56 will operate the contacts 58 so that the motor 54 will be rotating such that the trough 2 rotates towards the east. The resistor 70 and capacitor 72 provide a time delay of the order of say 200 milliseconds to ensure that the motor 54 has been arrested as will be explained hereinafter prior to operation of the contacts 58. The Q output of the flip-flop 64 is coupled to an input of OR gate 94 which enables power to be supplied to the motor 54 as will be explained hereinafter.

On reaching the easterly limit, the switch 20 is closed causing a rapid discharge of capacitor 74. The capacitor 74 is coupled to the reset input R of the flip-flop 64 via an inverting amplifier 76 so that discharge of the capacitor 74 causes the Q output of the flip-flop 64 to go low. This, in turn, to causes the relay coil drive transistor 68 to turn off and hence the relay contacts 58 to reverse. Additionally, the output of the amplifier 76 is coupled to AND gate 120 the output of which is coupled to timer 62 as explained hereinafter. This coupling causes power to be cut to the motor 54 for a period determined by the timer 62, the arrangement being such that the motor is arrested before reversal of the contacts 58 by virtue of the time delay caused by the resistor 70 and capacitor 72 which are coupled to the base electrode of the transistor 68.

The output of the amplifier 76 is also coupled to a differentiating circuit 78 to produce, on closing of switch 20 a positive pulse which is applied to the reset terminal R of the timer 62 via OR gates 80, 82 and 84. The output from the timer 62 is connected to the set input of a flip-flop 86 which functions as a storage device to hold the output of the timer 62. The reset terminal R of the flip-flop 86 is coupled to the output of OR gate 82 and is thus reset on closing of the east limit switch 20. Output from the flip-flop 86 is connected to the base electrode of a motor drive FET 88 via OR gates 90, 92 and 94, AND gate 96, and two inverters 98 and 100. The other input to the AND gate 96, line 102, is high when the phototransistors 42 and 44 are not equally irradiated so that a high level on the Q output of the flip-flop 86 will cause the FET 88 to turn on and thus the motor 54 to rotate in a direction as determined by the contacts 58. Thus, when the east limit switch 20 is closed the timer 62 and flip-flop 86 are reset, the Q output of the flip-flop 86 will be low untill 10 minutes have elapsed as determined by the timer 62 whereupon the Q output will then go high and turn on the FET 88 and so cause operation of the motor 54.

Assuming that the phototransistors 42 and 44 do not produce signals indicative of correct alignment of the apparatus with the sun, the level on the line 102 will remain high and the motor 54 will continue to rotate the trough towards the west until the west limit switch 22 is closed. This will cause capacitor 104 to discharge thereby causing the output of inverting amplifier 106 to go high. The output of the amplifier 106 is connected to the set input of a flip-flop 108 the Q output of which is connected to an input of OR gate 80 via a differentiating circuit 110 and to an input of OR gate 66. Closing of the west limit switch 22 will therefore cause resetting of the timer 62 and flip-flop 86. The Q output of the flip-flop 86 will go low and the FET 88 will remain off until the timer 62 turns it on again. Closing of the west limit switch 22 will activate the relay coil 56 to reverse the contacts 58 after the time delay caused by the resistance 70 and capacitor 72 to place the contacts 58 in a position appropriate for eastward rotation of the trough 2. The output of amplifier 76 is coupled to the Reset terminal of flip-flop 108 via OR gate 146 to reset the flip-flop on closure of the easterly limit switch 20.

The motor 54 is arranged to have dynamic braking and this is affected by coupling of a 0.220 ohm impedance 112 across the motor terminals when the FET 88 is to be turned off. This is accomplished by coupling the output of the inverting amplifier 98 to transistors 114 and 116, the transistor 116 being turned on to couple the impedance 112 across the motor terminals to thus absorb the energy in the motor quickly.

After closure of the switch 22, the trough will remain at the westerly limit for ten minutes as determined by the timer 62 and thereafter the FET 88 will be turned on to cause the motor 54 to again rotate the trough towards the east. The repetitive rotation reversals and delays will thus continue until the phototransistors 42 and 44 cause a change in the level on line 102. Further, this mode could be interrupted by deactivation of the daylight sensing phototransistor 60. If the transistor 60 turns off, the output of inverting amplifier 118 will go high. The output of amplifier 118 is connected to one input of an AND gate 120 the other input of which is connected to the output of amplifier 76. When the trough rotates to its easterly extreme and activates the switch 20, the output of the gate 120 will go high thus maintaining a high level on the Reset input of the timer 62. This will be maintained whilst the daylight sensing transistor 60 is off thus preventing turning on of the FET 88. Normally the transistor 60 will go off in the evening and the trough is therefore conveniently oriented towards the east for resumption of tracking the following morning.

The circuit also includes a fault detector which senses when the motor 54 has been running for longer than a predetermined period which is longer than the time it takes to rotate the trough from the eastern limit to the western limit. That rotation time is typically of the order of say one or two minutes and so the fault period is set at say five minutes. If the motor is sensed as running longer than the fault period, it is assumed that the trough has been jammed and accordingly the motor is deactivated. This is effected by providing a timing circuit 122 clocked by the oscillator 63, the Reset terminal being coupled to the output of inverting amplifier 98. The circuit 122 is thus reset after the delay caused by the timer 62 has elapsed on activation of the limit switches 20 and 22. The Q output of the timer 122 is connected to the input of an amplifier 124 the output of which is connected to the base electrode of a transistor 126. The collector of the transistor is connected to the gate electrode of the FET 88 the arrangement being such that when the Q output of the timer 122 is low the transistor 126 is off and it does not affect the operation of the FET 88 as determined by the output of the inverting amplifier 100. If however the timer 122 is not reset before say five minutes its Q output goes high causing the transistor 126 to turn on thus holding the gate electrode of the FET 88 at a low level whereupon it cannot be turned on and thus the motor will not run.

The circuit includes a sensor for sensing excessively high currents in the motor and arranging to turn the FET 88 off when overcurrents are sensed. This is effected by placing a resistor 128 (0.010 ohms) in series with the FET 88 and coupling the voltage level at the resistor 128 to the input of amplifier 124 so that if the motor current which flows through the FET 88 exceeds a certain level, the higher voltage on resistor 128 will cause the transistor 126 to turn on thus holding the FET 88 off.

The emitters of the phototransistors 42 and 44 are connected to inputs of a quad analogue switch 130 which comprises an intergrated circuit serial No. 4066, which functions as a reversing switch controlled by the Q and $\bar{Q}$ outputs of the flip-flop 108. The outputs of the switch 130 are connected to the inputs of a differential amplifier 132 the output of which is in turn connected to the input of a Schmitt trigger 134 and the into one input of an NAND gate 136. The emitters of the phototransistors 42 and 44 are also connected to a gate 138 which functions as an OR gate (In the illustrated circuit, three NAND gates are connected together so as to logically function as an OR gate). Output of the gate 138 is connected to the other input of the NAND gate 136. The arrangement is such that the output of the gate 138 will be high when one or both of the phototransistors 42 and 44 are on and low when they are both off. This enables the gate 136 to distinguish between the cases where (a) the differential amplifier 132 has a zero output which will occur when both phototransistors 42 and 44 are irradiated to the same degree and (b) when neither is irradiated at all. Output from the NAND gate 136 is coupled via inverting amplifiers 140 and 142 to the line 102 into the AND gate 96. Thus, when the phototransistors 42 and 44 are irradiated equally, there will be zero output from the differential amplifier 32 and the trigger 134 will produce a high pulse which triggers the NAND gate 136. This will produce a low pulse on the line 102 and thus cause the output of AND gate 96 to go low and hence the FET 88 will turn off.

Output from the NAND gate 136 is coupled by an inverting amplifier 144 to the Reset terminal of the flip-flop 108 via OR gate 146 so as to reset that flip-flop causing its Q output to go high. If the trough is tracking in the westerly direction, the Q output of the flip-flop 108 will already be high there will be no change. If however the trough is tracking in the easterly direction, the Q output will be low and will be changed to high by the pulse applied to its Reset terminal by the gate 146, and hence the relay coil 56 will be operated so as to change the contacts 58 so that thereafter the trough will track in the westerly direction to follow the sun.

Output from the gate 138 is applied via an inverting amplifier 148 to an input of OR gate 82 so as to reset the timer 62 via OR gate 84 and to reset the flip-flop 86. This causes the FET 88 to remain off for ten minutes as determined by the timer 62 each time the output of the gate 138 goes low corresponding to loss of sufficient intensity of solar radiation to cause the phototransistors 42 and 44 to remain on. For instance, if the sun is obliterated by a dark cloud, the trough will remain motionless for ten minutes and after that period the FET 88 will be turned on and the trough will be rotated in the westerly direction until the phototransistors 42 and 44 again produce equal output.

In order to avoid tracking inaccuracies owing to different positions of the head 18 in accordance with whether focus is achieved whilst tracking in the easterly direction on the one hand and the westerly direction on the other, the reversing switch 130 is used so as to switch the outputs of the phototransistors 42 and 44 into the inputs of the differential amplifier 132 in accordance with the direction of rotation. This is accomplished by coupling the switch 130 to the outputs of the flip-flop 108 the outputs of which are dependant upon the direction of rotation.

The output of gate 138, which senses when at least one of the phototransistors 42 and 44 is on, is applied through amplifier 148, delay circuit 150 and amplifier 152 to the base electrode of a drive transistor 154. The transistor 154 controls the flow of current to a pump relay 156 the contacts 158 of which control supply of power to a pump 160 which pumps heat transfer fluid through the tube 10. The delay circuit 150 serves to keep the transistor 154 on for a predetermined period, say two minutes, after both of the phototransistors 42 and 44 have been turned off through loss of sun. This prevents undesirable switching of the pump when the sun's rays are partially obscured by clouds and also ensures that solar energy concentrated onto the tube 10 has sufficient time to be transferred to the heat transfer fluid flowing within the tube 10.

When both of the phototransistors 42 and 44 are off, the output of gate 138 will be low and accordingly the output of inverting amplifier 148 will be high. The output of amplifier 148 is applied to the Reset terminal of timer 62 through OR gates 82 and 84 and to the Reset terminal of flip-flop 86 through OR gate 82. The arrangement is such that after the elapse of ten minutes without either of the phototransistors 42 and 44 being turned on, the Q output of flip-flop 86 will go high and turn the FET 88 on so that it will cause rotation of the trough with reversals and delays as described previously. If however the sun is only momentarily lost, the output from the gate 138 is made to override the resetting of the timer 62 to prevent the trough entering into the reversal and delay mode. This is accomplished by coupling the output of the gate 138 to the OR gate 92, the output of the gate 92 being high when either of the phototransistors 42 and 44 is on. This effectively nullifies the effect of resetting of the timer 62 and gives control of switching of the FET 88 to the line 102 which is coupled to the phototransistors 42 and 44 through the differential amplifier 132.

The circuit may include a manually operated switch 162 which on closing applies a high input to the OR gate 90 so as to provide for switching on of the FET 88 manually so as to rotate the trough to a selected position for parking, washing or maintenance.

Figure 7:
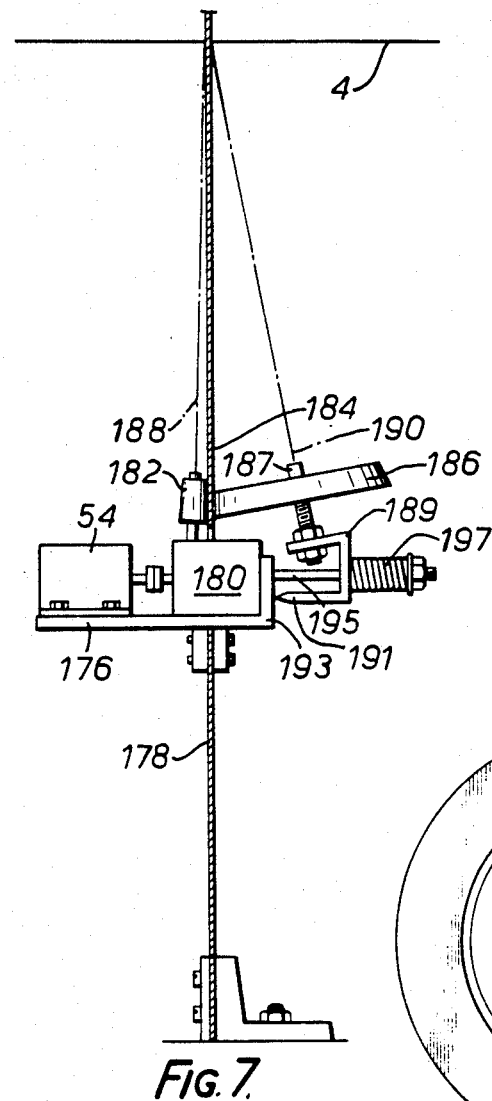
FIG. 7 shows diagrammatically one technique for coupling the drive motor to the reflective trough.
Figure 8:
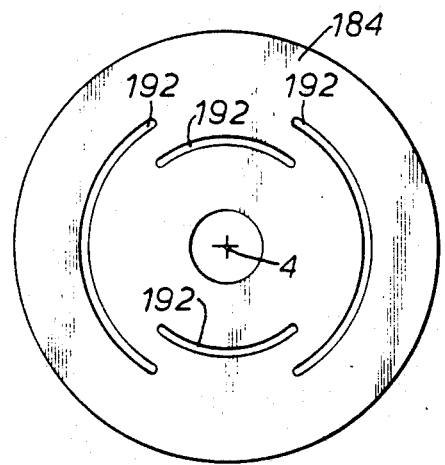
FIG. 8 is a side view of part of the arrangement shown in FIG. 7.

FIGS. 7 and 8 diagrammatically illustrate one technique for coupling the motor 54 to the trough 2. The arrangement is an improvement of the arrangement illustrated in Australian Patent Application No. 29159/84. In the illustrated arrangement, the motor 54 is mounted upon a base plate 176 which is carried by a relatively flexible mounting plate 178. The output shaft of the motor 54 is connected to a gear box 180 the output of which is connected to a conical friction drive member 182. The drive member 182 is in engagement with a sheet metal drive disc 184 which is coupled with the trough 2 so that rotation of the disc 184 causes rotation of the trough. The arrangement also includes a conical reaction disc 186 of relatively large diameter, the disc 186 being resiliently biased into engagement with the drive disc 184 so that the friction disc 82 maintains good driving contact with the outer periphery of the driving disc 84. The disc 186 is mounted for rotation on a shaft 187 carried by a bracket 189 which has one leg 191 in pivotal contact with a flange 183 formed on the plate 176. A shaft 195 extends from the flange 193 through an opening (not shown) in the bracket 189 and a spring 197 acts between the shaft 195 and the bracket 183 to bias the latter towards the drive member 182. Axes 188 and 190 of the drive member and disc 186 intersect with the plane of the drive disc 184 at the axis 4 of the trough so as to maintain rolling contact between the member 182, drive disc 184 and reaction disc 186. Both the mounting plate 178 and the drive disc 184 are made from relatively thin sheet material such as stainless steel so that these parts can undergo flexure about axes perpendicular to the axis 4 but are relatively inflexible relative to axes parallel to the axis 4. In other words, the disc 184 and plate 178 do not flex in the direction in which driving forces are transmitted but are capable of flexure in other directions so as to accommodate manufacturing imperfections and mis-alignments. If necessary, the drive disc 184 may be provided with circumferentially extending slots 192 as is illustrated in FIG. 9 to increase its flexure.

FIG. 9 illustrates part of a reflective parabolic trough made analogously with the general arrangement disclosed in U.S. Pat. No. 4,321,909. The trough includes a plurality of ribs 252 each of which has an accurately formed concave parabolic edge 254. Reflective aluminium sheets 256 are biased into intimate contact with the edges 254 so that the sheets 256 form a reflective parabolic surface. The lateral edges of the sheets 256 are formed with U-shaped channels 258 which have the dual purpose of serving as a mounting recess for the edges of glass panes 260 and to strengthen the lateral edges of the sheets 256 to prevent unwanted deflections. In the arrangement illustrated in FIG. 9, the sheets 256 are biased into intimate contact with the edges 254 by means of compression springs 262 which act between the upper face of the channel 258 and a lever 264 which is pivoted to the ribs 252 at 266. The other end of the lever 264 has nut 268 connected to or in engagement therewith, the nuts receiving an adjusting screw 270 formed on the rib. The arrangement is such that adjustment of the screw 270 alters the compressive force supplied to the spring 262 and hence to the sheets 256.

The arrangement illustrated in FIG. 10 is somewhat analogous except that the spring 262 and lever 264 are omitted and adjusting screw 274 is directly upon the upper face of the channel member 258.

Both the arrangements of FIGS. 9 and 10 are relatively unaffected by differential thermal expansions between the ribs 252 and the sheets 256.

The solar energy utilization system shown in FIGS. 11 and 12 comprises a plurality of tracking solar collecting troughs 2 which concentrate solar energy on to heat transfer conduits 10. For instance, the troughs 2 may be tracking parabolic troughs of the type disclosed in U.S. Pat. No. 4,321,909. The conduits 10 are connected to a common line 306 which leads to a solar energy utilization apparatus 308 which functions as a heat transfer element and a condenser for any vaporized heat transfer fluid in the common line 306. A fluid return line 318 returns heat transfer fluid from the apparatus 308 to the tops of the troughs 2 via an expansion column 310, pump 312, filter 314, and capillary tubes 316. The expansion column 310, pump 312, and filter 314 are connected generally speaking in the return line 318 and the capillary tubes 316 branch off from the return line to the respective heat transfer conduits 10 of the troughs 2. The pump 312 has a by-pass valve 320 connected across it, the valve 320 serving to regulate the pressure of the heat transfer fluid at the outlet of the pump.

The expansion column 310 includes a chamber 322 which has an inlet port 324 located near its top and connected to the return line 318 from the apparatus 8. The chamber has an outlet port 326 located at a lower level than the port 324 and connected to the return line 318 leading to the pump 312. The arrangement is such that the outlet port 326 will act as a trap for air bubbles which will rise through a third port 328 which is connected to a conduit 330 which leads to a header tank 332. The header tank 332 serves as a reservoir for replenishing heat transfer fluid and is connected to a supply line 334 via a float valve 336. The conduit 330 includes a pressure relief valve 338 which will permit heat transfer fluid to pass through the conduit 330 into the header tank 332 when expansion of the fluid causes the pressure to rise above the opening point of the valve 338. When the temperature of the system falls and thermal contraction occurs, a check valve 340 connected across the pressure relief valve 338 will permit flow of heat transfer fluid from the header tank 332 into the conduit 330 and then into the return line 318. The presence of the header tank 332 connected in the system in the manner shown always ensures that a positive pressure is maintained in the heat transfer system.

The system could operate with various fluids as the heat transfer fluid. A particularly suitable heat transfer fluid would be water and the operation of the system will be described with water as an example. In a typical arrangement, the pump 312 could be arranged to produce a pressure of about 100 p.s.i. at its output, there being no significant pressure drop along the return line 318 until the start of the capillary tubes 316. There will be a considerable pressure drop across the capillary tubes 316 say of the order of 70 p.s.i., the actual pressure drop depending on flow rate. The pressure drop in each of the capillary tubes can be made substantially uniform. There will be a relatively insignificant pressure drop along the heat transfer conduits 10 and about 30 p.s.i. pressure drop along the common line 306 and through the apparatus 308, whereby minor differences in pressure drops which may occur in the various conduits 10 are swamped out.

The flow rate through the respective heat transfer conduits 10 is arranged to be such that when the troughs 2 are receiving maximum solar radiation the flow rate through each of them is chosen so that it will vaporize approximately 50 percent of the water supplied thereto. For collectors which have a collecting surface of approximately 10 square meters, a flow rate of about 4.5 liters per hour is all that is necessary. The lengths and diameters of the capillary tubes 316 are selected so as to give the required pressure drop at the flow rate through the respective heat transfer conduits 10. For a flow rate of 4.5 liters per hour a capillary tubing which has an internal bore of say 2 mm and a length of about 50 feet will give the required 70 p.s.i. pressure drop.

When the system is operating, the flow rates through the collectors is such that approximately half of the water supplied thereto is vaporized and a significant proportion of the energy transferred through the common lines 306 will be in the form of latent heat of vaporization of the steam, that latent heat being made available in the apparatus 308 on condensation of the steam.

It has been calculated that for a system where there are 20 collectors each of approximately 10 square meters collecting surface the return line 306 and the line 318 may comprise copper tubing or pipe of a nominal diameter of 0.5 inches. This is considerably less than the diameter required in known systems and consequently the losses from the lines 306 and 318 are very small.

The power supply to the pump 320 is controlled by thermostatic elements (not shown) located in the heat transfer conduits 10 the arrangement being such that the pump 312 is only stopped when all of the thermostatic elements register temperatures below predetermined levels so that flow will continue even though only one of the collectors is producing useful output. The flow through the other collectors is so small that it does not significantly affect the overall performance even though the design temperature is not reached in the heat transfer fluid. It is further preferred that the pump 312 continues for a predetermined period say 5 minutes after each of the thermostatic elements has fallen below operating temperature so as to avoid unnecessary starting and stopping of the pump. Once however the pump does stop, any vapour in the return lines 306 will be condensed in the apparatus 308 and thus its energy will be usefully exchanged in that apparatus. This compares most favourably with single phase systems in which no such transfer would occur.

FIG. 13 schematically illustrates a system for circulating a heat transfer fluid. In the system, a heat transfer fluid such as water is stored in a header tank 342 which is connected to the upper end of the heat transfer conduit 10 via a check valve 346. Heat energy is applied to the conduit 10 at a temperature which is sufficient to cause vaporization of the heat transfer fluid. This may be accomplished by means of a tracking parabolic trough 2 which concentrates the sun's rays upon the conduit 10. The other end of the conduit 10 is connected to one end of a heat transfer coil 350 located within a hot water storage vessel 352. The other end of the coil 350 is connected to the header tank 342 via a check valve 354.

When sufficient heat is applied to the conduit 10 in order to raise the temperature of the water to boiling point, vaporization will occur at least at one zone in the conduit 10. This will be accompanied by an increase in pressure which will force the water and steam towards the coil 350 since it cannot flow in the reverse direction because of the check valve 346. The hot water will thus flow through the coil 350 and thereby transfer heat to the water within the hot water vessel 352 and then to the header tank 342 via the check valve 354. The stage will be reached when there will be only steam remaining in the conduit 344 and coil 350 whereupon the vessel 352 and coil 350 will serve as a condenser, condensing the steam to the liquid phase which will be accompanied by a sudden drop in pressure. Water cannot flow from the header tank 342 to the coil 350 because of the check valve 354 but water can flow through the check valve 346 into the conduit 344 and coil 350. The collector 348 will once again heat the water within the conduit 344 so that circulation will occur when boiling point is reached. It will be appreciated that this process will be repeated as long as the trough 2 can supply sufficient energy to the conduit in order to induce boiling.

From the point of view of energy transfer, it will be appreciated that the solar energy collected by the trough 2 is transferred to the water within the vessel 342 without the use of any external pumps. It is further noted that the vessel 352 can be located at a lower level relative to the collector 348 since the system does not rely on convection currents. This is seen as a significant advantage because the collector could be mounted on a roof of a house or other building and the vessel 352 located at ground level.

I claim:

1. A method of constraining an object to track the sun, the object being mounted for rotation about an axis and having a reversible motor for rotating the object and a control circuit for controlling operation of the motor, the control circuit having first and second limit switches which are operable to reverse the direction of rotation when the object has reached first and second extreme positions, first solar energy detection means operable to detect the presence of a first level of solar energy and second solar energy detection means operable to detect the presence of a second level of solar energy, higher than said first level, and to generate an interrupt signal when the object is aligned with the sun and said second level is detected, said method comprising the steps of:

(a) orientating the object so that the axis of the object lies in a predetermined direction, (b) activating the control circuit so that the motor causes rotation of said object, (c) interrupting the supply of power to said motor when said interrupt signal is generated by said second detection means, (d) after generation of the interrupt signal, reapplying power to the motor such that the motor rotates the object towards a westerly direction until generation of a subsequent interrupt signal or until said first limit switch is activated, (e) causing a first predetermined delay when said first limit switch is activated, (f) after said first delay, re-applying power to the motor such that the motor rotates the object towards an easterly direction until said second limit switch is activated, (g) causing a second predetermined delay when said second limit switch is activated, and (h) after said second delay and provided said first level of solar energy is detected, re-applying power to the motor so that the object is rotated towards a westerly direction.

2. A method as claimed in claim 1 including the further step of causing said predetermined delays to be of approximately 10 minutes duration.

3. Solar tracking apparatus comprising an object mounted for rotation about an axis which, in use, is orientated in a predetermined direction, a reversible motor coupled to cause rotation of the object about said axis and control means for controlling the motor such that it rotates the object between first and second extreme positions which, in use, are located towards the West and East respectively, said control means including a first solar energy sensitive element operable to detect the presence of a first level of a solar energy and second solar energy sensitive elements mounted for movement with the object and operable to detect the presence of a second level of solar energy, higher than said first level, and to produce an interrupt signal when the object is aligned with sun and said second level is detected, to arrest rotation of the object by the motor, said interrupt signal inhibiting rotation of the motor whilst the object remains aligned with the sun; and wherein the control means causes, rotation of the object towards said first extreme position when the object is no longer aligned with the sun, inhibits the rotation of said motor for a first predetermined delay when said object reaches said first extreme position, reverses the direction of said motor and, after said first predetermined delay, causes rotation of said object towards an easterly direction, inhibits the rotation of the motor for a second predetermined delay when said object reaches the second extreme position, reverses the direction of the motor, and after said second predetermined delay and provided said first level of solar energy is detected, causes rotation of said object towards a westerly direction.

4. Apparatus as claimed in claim 3 wherein the object comprises a reflective parabolic through whose focal line coincides with said-axis.

5. Apparatus as claimed in claim 3 wherein the second solar energy sensitive elements are connected to respective inputs of a differential amplifier and arranged to produce the interrupt signal when the elements are equally irradiated by solar radiation.

6. Apparatus as claimed in claim 3 wherein the control means includes first and second limit switches whose states are changed by said object as it arrives at its first and second extreme positions respectively, said control means including timing means coupled to said limit switches and operable to produce a disable signal each time the state of one of said limit switches changes, thereby inhibiting rotation of the motor for said predetermined delays as determined by said timing means each time the object arrives at the first and second extreme positions.

7. Apparatus as claimed in claim 6 wherein there are two of said second solar sensitive elements, said control means including first gating means coupled to said second solar energy sensitive elements and operable to produce an enable signal when at least one of said second solar energy sensitive elements is activated by solar radiation and including second gate means which gates said enables signal and said interrupt signal and passes the interrupt signal to its output only when both said signals are simultaneously present.

8. Apparatus as claimed in claim 6 wherein the control means includes third gating means which gates the interrupt and disable signals, the output of the third gating means being coupled to the base or gate electrode of a motor drive transistor, the arrangement being such that the transistor is only turned on when the interrupt and disable signals are not simultaneously present at the inputs of the third gating means.

9. Apparatus as claimed in claim 8 wherein said disable signal from the timing means is coupled to a fourth gating means the other input of which is coupled to the enable signal, the output of the fourth gating means being coupled to the input of the third gating means, whereby said enable signal can override the disable signal from the timing means.

10. Apparatus as claimed in claim 9 wherein said limit switches are coupled to anversing relay the contacts of which are located between the motor drive transistor and the motor whereby the direction of rotation of the motor is dependent upon the states of said limit switches.

11. A method of constraining an object to track the sun, the object being mounted for rotation about an axis and having a reversible motor for rotating the object and a control circuit for controlling the operation of the motor such that the object is in a search mode or a tracking mode, the control circuit having first and second limit switches which are operable to reverse the direction of rotation of the object when it has reached first and second extreme positions, said method comprising the steps of:

(a) activating the control circuit so that the object initially enters the search mode in which the motor causes rotation of the object towards a westerly direction until the first limit switch reverses the direction of rotation whereupon the object will rotate towards the second extreme position, the rotation in the search mode being continuous until activation of the limit switches or transition to the tracking mode;

(b) maintaining the object in the search mode until an interrupt signal is generated whereupon the object will enter the tracking mode, and wherein, in the tracking mode after generation of said interrupt signal, the motor is de-activated and the object remains stationary and in alignment with the sun, and (c) maintaining the object in said stationary position until the sun's movement is such that the object is no longer aligned with the sun whereupon the interrupt signal is no longer generated and the motor is caused to rotate the object towards a westerly direction until another interrupt signal is generated on re-alignment of the object with the sun.

12. A method as claimed in claim 11 wherein, in the search node, causing a predetermined delay after the object has reached the first and second extreme positions.

13. A method as claimed in claim 12 wherein said delay is about 10 minutes.

14. A method as claimed in claim 11 wherein the transistion from the search mode to the tracking mode can only occur whilst the object is being rotated in a westerly direction.

15. A method as claimed in claim 11 sensing the intensity of solar radiation and determining when the intensity falls below a predetermined level and causing the object to enter a rest mode in which all rotation of the object is prevented.

16. A method as claimed in claim 15 wherein when the intensity of solar radiation falls below said elvel the interrupt signal is generated and maintained.

17. A method as claimed in claim 16 wherein the transition from this search mode to the rest mode occurs only when the object is at said second extreme position.

18. A method as claimed in claim 15 wherein the transition from the search mode to the rest mode occurs only when the object is at said second extreme position.

* * * * *